UNITED STATES PATENT OFFICE.

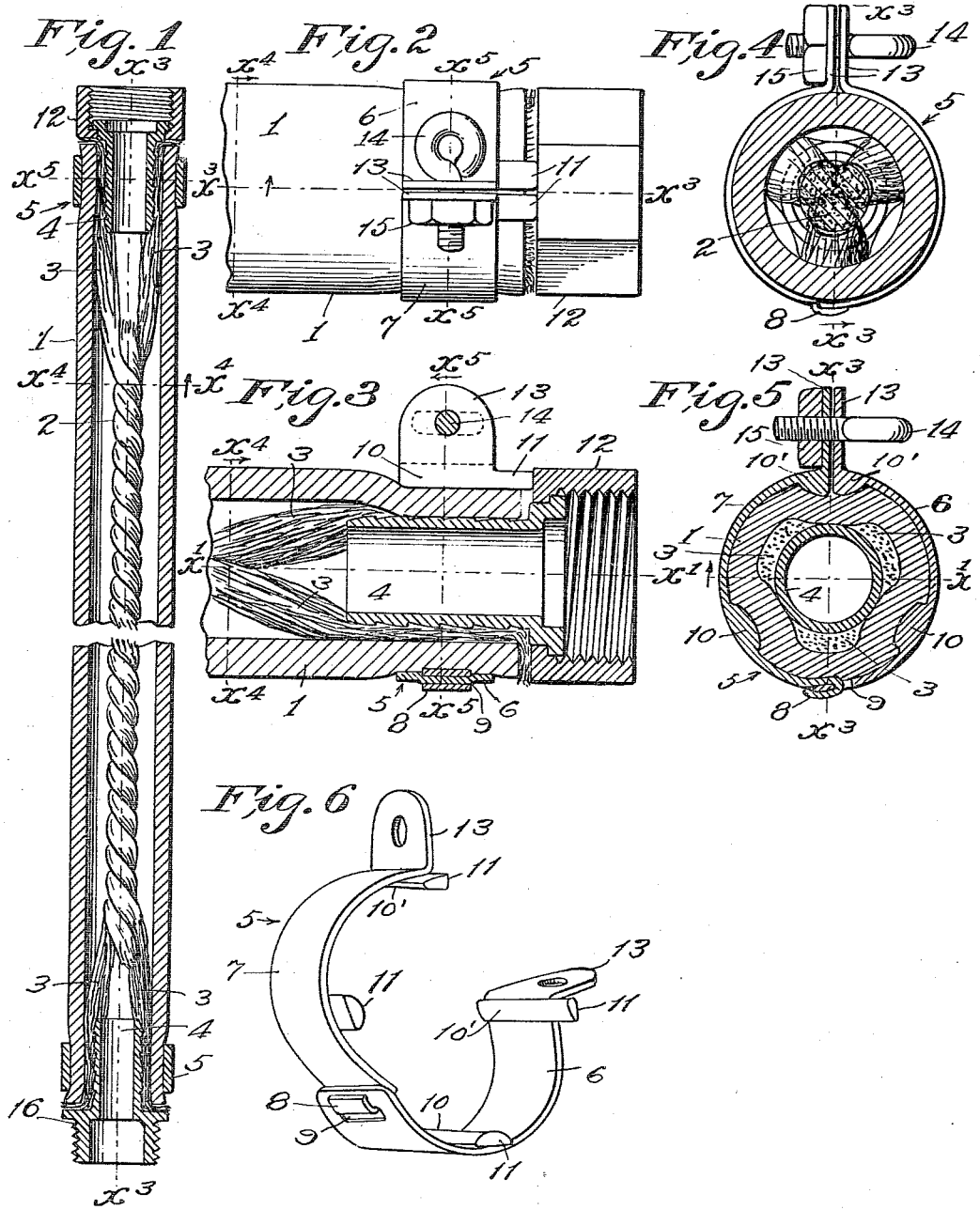

ROBERT H. BROWN, OF LOS ANGELES, CALIFORNIA.

HOSE.

957,492.

Specification of Letters Patent. Patented May 10, 1910.

Application filed October 27, 1909. Serial No. 526,635.

*To all whom it may concern:*

Be it known that I, ROBERT H. BROWN, a citizen of the United States, residing at Los Angeles, in the county of Los Angeles and State of California, have invented a new and useful Improvement in Hose, of which the following is a specification.

An object of this invention is to provide a canvas, cotton, rubber or other flexible hose which will be less liable than such hose heretofore, to destruction or weakening by stretching and kinking, and that will not be liable to wear or break at the coupling and in which the coupling itself will be held against wiggling and becoming loose or worn.

The invention relates to both interior and exterior elements and to the body and the joints of the hose.

Another object is to secure the said objects with relation to hose already manufactured under the present forms so that thin cotton hose or any other flexible hose now in use and liable to the usual wear, may be supplied with the necessary elements to greatly increase the life of the hose.

The accompanying drawings illustrate the invention.

Figure 1 is a fragmental longitudinal section of a hose constructed in accordance with this invention. Fig. 2 is an elevational detail of one end of the same. Fig. 3 is a cross-sectional detail on line $x^3$, Figs. 1, 2, 4, and 5. Fig. 4 is a cross-section on line $x^4$, Figs. 1, 2 and 3. Fig. 5 is a cross-section on line $x^5$, Figs. 1, 2 and 3. Fig. 6 is a perspective view of the hose band detached.

Arrows on the several section lines indicate the direction of sight.

In order to prevent the tubular body 1 of the hose from stretching, it is provided on the inside with a core 2, which may be a cord or rope of appropriate size to give the required strength, and also to give a sufficient body to prevent the hose from kinking or bending too abruptly. The ends of the core are fastened by any suitable means to the ends of the tubular body 1, and this is accomplished in the form shown in the drawings by spreading the strands 3 of the rope around the end of the nipple 4 of the hose coupling. Said strands may be three in number as shown, and the hose band 5 is formed in two links 6, 7, hinged together by the hook and eye 8 and 9, and provided with internal cleats 10 that project from the edge of the band in the form of fingers 11 to engage the back of the union 12 to hold the same in true position so that it will not wiggle. Said cleats inside the band serve to indent the tubular body and press the same tightly in between the strands 3 so as to perfectly close the space around the nipple. The strands thus bent around the nipple of the coupling protect the hose against breakage which is liable to occur with the old style when the hose is bent at the end of the nipple. The links of the hose band are provided with perforated ears 13 which are clamped together by the bolt 14 and nut 15. The bolt 14 is preferably an eye bolt so that a nail, not shown, may be inserted into the eye for the purpose of tightening the band. The nut 15 may be of sufficient size to engage the band when the bolt 14 is inserted through the ears of the nut thus to prevent the nut from turning while the eye bolt 14 is being turned to tighten the band.

To construct my novel hose, the tubular body 1 of ordinary manufacture is made of any suitable material as cotton, hemp, or rubber filled and coated fabric which may be cut to the appropriate length and then the core 2, which may be of any suitable flexible material as jute, hemp, cotton or other rope, may be threaded through the tubular body 1 and the ends of said rope may be unraveled and spread apart so as to receive the nipples 4 of the hose couplings. Then the core 2 will be drawn tightly and the nipples inserted between the separate strands of the core and forced home allowing the strands of the core to extend outwardly, and said core being drawn taut so that when the nipples are fastened the strain of stretching the hose lengthwise will be borne by the core and not by the tubular portion. The bands 5 will be applied outside the tubular body to clamp the same tightly against the strands 3. The cleats 10 fit between the strands, there being practically three of such cleats for a threeply rope. In Fig. 6 each of the bands is shown at its end with a cleat 10', the same being practically half a cleat of the size shown at 10 so that when the band is clamped together the cleat 10' will serve as one cleat.

When the ears 13 have been brought sufficiently close together, the nut 15 will be brought into place and the eye bolt 14 will be inserted through the ears and will then be screwed into the nut. When this is completed the hose is finished; it being understood that one of the nipples will be provided with a union collar 12 before it is inserted into the hose and that the other nipple 4 will be provided with a shoulder 16 and that said union collar 12 and shoulder 16 will respectively fit against the fingers 11 thus to rigidly hold the nipples in place.

It is understood that the strands that are fastened to the ends of the hose need not be twisted into a single cord but that the core may be of a multiple nature. This may be especially desirable where the hose is of large diameter.

The core will preferably be saturated or otherwise treated with linseed oil or other water-proofing material so that it will resist the action of the water and other elements.

I claim:

1. A hose comprising a tubular body, nipples in the ends of the body, a core extending through the body and spread apart and extending between the nipples and the body, and bands to compress the body onto the core and nipple.

2. A hose comprising a tubular body, a core extending inside the body from end to end thereof and composed of strands, the ends of said strands being separated, nipples inserted between the separated strands inside the body, and bands compressing the body onto the strands and the nipple.

3. A hose comprising a tubular body, a rope composed of strands inside the body, the strands being separated at the ends of the body, nipples inserted into the body between the separated strands, bands fastened around the body and provided with internal ribs to press the hose body between the strands, and means to tighten the band on the hose body.

In testimony whereof I have hereunto set my hand at Los Angeles, California, this 11th day of October, 1909.

ROBERT H. BROWN.

In presence of—
JAMES R. TOWNSEND,
L. BELLE RICE.